(12) United States Patent
Turpin et al.

(10) Patent No.: US 8,818,950 B2
(45) Date of Patent: Aug. 26, 2014

(54) METHOD AND APPARATUS FOR LOCALIZED PROTECTED IMAGING OF A FILE SYSTEM

(75) Inventors: Kevin J. Turpin, Orem, UT (US); Jonathan P. Richey, Springville, UT (US); Michael R. Steed, Genola, UT (US)

(73) Assignee: Symantec Corporation, Mountain View, CA (US)

( * ) Notice: Subject to any disclaimer, the term of this patent is extended or adjusted under 35 U.S.C. 154(b) by 2539 days.

(21) Appl. No.: 10/762,866

(22) Filed: Jan. 22, 2004

(65) Prior Publication Data
US 2005/0165853 A1 Jul. 28, 2005

(51) Int. Cl.
*G06F 12/00* (2006.01)
*G06F 7/00* (2006.01)

(52) U.S. Cl.
USPC ............................ 707/639; 711/161; 711/162

(58) Field of Classification Search
USPC .......................................... 707/102, 200–205
See application file for complete search history.

(56) References Cited

U.S. PATENT DOCUMENTS

| | | | |
|---|---|---|---|
| 5,301,286 A | 4/1994 | Rajani | |
| 5,325,519 A | 6/1994 | Long et al. | |
| 5,414,850 A | 5/1995 | Whiting | |
| 5,448,718 A | 9/1995 | Cohn et al. | |
| 5,546,534 A | 8/1996 | Malcolm | |
| 5,832,526 A | 11/1998 | Schuyler | |
| 6,026,016 A * | 2/2000 | Gafken | 365/185.04 |
| 6,052,764 A | 4/2000 | Mogul | |
| 6,185,666 B1 | 2/2001 | Murray et al. | |
| 6,253,300 B1 * | 6/2001 | Lawrence et al. | 711/173 |
| 6,275,953 B1 * | 8/2001 | Vahalia et al. | 714/11 |
| 6,279,093 B1 | 8/2001 | Beelitz | |
| 6,321,358 B1 | 11/2001 | Anderson | |
| 6,378,054 B1 | 4/2002 | Karasudani et al. | |
| 6,453,383 B1 * | 9/2002 | Stoddard et al. | 711/112 |
| 6,487,561 B1 * | 11/2002 | Ofek et al. | 707/204 |
| 6,530,077 B1 | 3/2003 | Marsh | |
| 6,615,365 B1 * | 9/2003 | Jenevein et al. | 714/6 |
| 6,665,779 B1 * | 12/2003 | Polfer et al. | 711/162 |
| 6,938,057 B2 * | 8/2005 | Gusler et al. | 707/204 |

(Continued)

FOREIGN PATENT DOCUMENTS

| | | |
|---|---|---|
| EP | 1239384 | 9/2002 |
| GB | 2376093 | * 12/2002 |

OTHER PUBLICATIONS

"Acronis", http://www.acronis.com/en-us/?stay=1, (2002).

(Continued)

*Primary Examiner* — Ajay Bhatia
*Assistant Examiner* — John J Morris
(74) *Attorney, Agent, or Firm* — ALG Intellectual Property, LLC

(57) ABSTRACT

A local imager (202) copies each allocation unit (302) occupied by a file (305) of a file system (102) to a locally-stored image file (204) within the same partition (104) as the file system (102). The allocation units (302) may be compressed as they are copied, resulting in a locally-stored image file (204) that occupies fewer allocation units (302) than the original file system (102). In addition, the local imager (202) adds a directory map (312) to the locally-stored image file (204) that associates copied allocation units (302) in the locally-stored image file (204) with names of corresponding files (305) from the file system (102).

39 Claims, 9 Drawing Sheets

(56) References Cited

U.S. PATENT DOCUMENTS

| | | | |
|---|---|---|---|
| 6,971,018 B1* | 11/2005 | Witt et al. | 713/187 |
| 7,051,053 B2* | 5/2006 | Sinha | 707/204 |
| 7,072,916 B1* | 7/2006 | Lewis et al. | 707/205 |
| 2001/0044904 A1* | 11/2001 | Berg et al. | 713/201 |
| 2002/0019907 A1 | 2/2002 | McMurdie et al. | |
| 2002/0087588 A1* | 7/2002 | McBride et al. | 707/204 |
| 2002/0095615 A1* | 7/2002 | Hastings et al. | 714/4 |
| 2002/0120763 A1* | 8/2002 | Miloushev et al. | 709/230 |
| 2002/0143779 A1 | 10/2002 | Backman | |
| 2002/0188605 A1* | 12/2002 | Adya et al. | 707/4 |
| 2003/0177321 A1* | 9/2003 | Watanabe | 711/161 |
| 2003/0182253 A1* | 9/2003 | Chen et al. | 707/1 |
| 2003/0182322 A1* | 9/2003 | Manley et al. | 707/201 |
| 2003/0221076 A1* | 11/2003 | Milligan et al. | 711/165 |
| 2004/0068523 A1* | 4/2004 | Keith et al. | 707/200 |
| 2004/0083245 A1* | 4/2004 | Beeler, Jr. | 707/204 |
| 2004/0088513 A1* | 5/2004 | Biessener et al. | 711/173 |
| 2004/0098547 A1* | 5/2004 | Ofek et al. | 711/162 |
| 2004/0103104 A1* | 5/2004 | Hara et al. | 707/100 |
| 2004/0260900 A1* | 12/2004 | Burton et al. | 711/162 |
| 2006/0149889 A1* | 7/2006 | Sikha | 711/100 |

OTHER PUBLICATIONS

"Vcommunications", http://www.applegate.co.uk/ycommunications-2274354.html, (1996).

"Xpoint Technologies, Inc.", http://www.insideview.com/directory/xpoint-technologies-inc, (Mar. 2003 or earlier).

* cited by examiner

METHOD AND APPARATUS FOR LOCALIZED PROTECTED IMAGING OF A FILE SYSTEM

TECHNICAL FIELD

The present invention relates generally to the field of data storage. More specifically, the present invention relates to techniques for imaging and restoring a file system.

BACKGROUND OF THE INVENTION

Random access storage devices, such as magnetic disks, optical disks, flash memory, and the like, are typically subdivided into discrete storage blocks. Each such block has a predefined storage capacity that is smaller than the overall capacity of the storage device.

The storage blocks of a magnetic disk are often referred to as "sectors." Groups of sectors are sometimes called "clusters." Data files are recorded on storage devices using these sectors or clusters as elementary building blocks. A data file is accessed by identifying the storage blocks that have been assigned to that data file and reading from, or writing to, the identified storage blocks as necessary. A "file system" is a set of data files stored in a predetermined way on a storage device.

In accessing a specified portion of a file for purposes of reading data from and/or writing data to that file portion, the system must identify the specific physical location of the one or more corresponding storage blocks either directly or indirectly. Signals representing the identified physical locations are generated and then provided, for instance, to a read/write head actuator of a magnetic disk drive.

Normally, a predefined portion of the storage device is set aside for storing organizational information, such as file names and hierarchical directory or folder structures. This organizational information identifies the specific blocks that form each data file. It also indicates the logical sequence or other logical organization of those file-forming blocks. The set-aside portion of the storage device is often referred to as the "directory" area.

Within this set-aside directory area there may exist additional control data structures that may also reside on the storage device. Some common names for these data structures are: file allocation table (FAT), index node (inode), and master file table (MFT). Typically, these control data structures identify which of the allocation units are free from defect such that they may be safely used for data storage. These control data structures will also indicate which of the defect-free allocation units are presently available for storing new data. Allocation units that store data of an existing file are designated as "not-free" or "used." Because each allocation unit can store a maximum amount of data, such as 1024 bytes (1K) or 4096 bytes (4K) per allocation unit, when a file is created for storing more than one-allocation unit's worth of data, the files are subdivided and distributed across a plurality of allocation units.

The directory area may also include a data structure sometimes referred to as a volume catalog. The volume catalog is established on the storage device for associating a file name with the stored data of the file. The volume catalog is also used for storing starting location data, such as track and sector numbers, that point to the physical location on the storage device at which the file starts. The volume catalog also usually stores file size data for indicating the size of the file in terms of the number of bytes that the particular file contains and/or ending location data for indicating where the file ends.

When a storage device is relatively new, either at the start of the device's operating life, or just after it has been re-formatted (initialized), the storage device has many regions of logically-contiguous and available storage blocks for receiving and contiguously storing the data of large files. The resulting file structures for an initial set of recordings tend to be logically contiguous or whole.

However, as the storage device begins to fill up, and as old files are deleted and newer files are added, and/or as pre-existing files are modified many times over, the stored files on the disk tend to become "fragmented." The term, fragmented, is used herein to describe the condition in which the data of a specific file is no longer entirely stored along a logically-sequential series of discrete storage blocks. Rather, the data of a fragmented file is scattered about the storage device in a more random, spaced-apart fashion.

When a file is fragmented, it may be necessary to perform multiple seeks between widely spaced-apart sections of the disk (e.g., jumps between nonadjacent tracks) in order to access the file for reading and/or writing. This may disadvantageously increase file access time. Accordingly, file fragmentation is generally undesirable.

A variety of events may occur during the operational life of a storage device that work to undesirably destroy or corrupt stored data. One of these damaging events may destroy or corrupt data stored in the directory area of the storage device. When this type of event occurs, it may no longer be possible to access certain files on the storage device. Reconstructing a damaged file system can be particularly difficult where the files are highly fragmented.

Individual data files can also be corrupted or destroyed in a way that does not affect the other files or the directory area. Similarly, files can be "destroyed" by being accidentally deleted or modified (e.g., saving an old version of a document over a new version).

Backing up the file system at regular intervals is the primary method for protecting valuable data from loss due to corruption of the directory area, accidental deletion or modification of files, etc. Traditionally, a user would need to selectively back up individual files from a primary storage device, such as a hard drive, to a backup storage device, such as a tape drive or optical drive. However, if the directory area of the primary storage device was subsequently damaged, the user would be forced to reformat the device and reinstall the operating system (OS) and application programs before being able to restore the backed-up files. This was a time-consuming and laborious process.

Disk imaging programs were later developed that allowed a user to copy an exact image of the entire file system, including the OS and all other software and data, to the backup storage device. In the event of file system corruption, the user could simply restore the image to the primary storage device to return the file system to its pre-imaging state.

Some disk imaging programs are able copy an image of a file system to another "partition" within the primary storage device. In IBM-compatible personal computers, hard drives may be divided into partitions, which are subdivisions of allocation units typically used to store a separate file system. For example, each partition has its own directory area, including a control data structure, volume catalog, etc. Accordingly, the partitions may be treated by the OS as separate logical storage devices.

However, reserving a partition for storing backup images reduces the space available to other partitions for storing programs and data. Moreover, each new partition adds overhead due to the additional file system, further reducing the available storage space.

SUMMARY OF THE INVENTION

The present invention solves the foregoing problems and disadvantages by providing a method and apparatus for localized protected imaging of a file system. In one embodiment, a local imager copies each allocation unit occupied by a file of a file system to a locally-stored image file within the same partition as the file system. The allocation units may be compressed as they are copied, resulting in a locally-stored image file that occupies fewer allocation units within the partition than the file system being imaged. In addition, the local imager adds a directory map to the locally-stored image file that, among other things, associates copied allocation units in the locally-stored image file with names of corresponding files from the file system.

Once the locally-stored image file has been created, a protection module may protect the image from accidental deletion or modification. The protection module may be embodied as a filter driver inserted between a process capable of accessing files and a file system driver. Alternatively, the protection module may be embodied as a process created upon boot up that opens and thereby locks the locally-stored image file so that subsequently-created processes cannot access it.

At a future point in time, a user may desire to restore the locally-stored image file to the partition, returning the file system to its pre-imaging state. For example, the file system may have been damaged or corrupted, or the user may have inadvertently deleted or modified certain key files.

In one embodiment, an image locater finds the locally-stored image file within the partition. This may entail searching for a unique beginning-of-image marker, or reading location information for a first allocation unit used by the locally-stored image file from a predetermined area of the partition.

Once the locally-stored image file is found, a media formatter initializes at least a subset of the allocation units of the partition not occupied by the locally-stored image file, including one or more allocation units used for a directory area of the partition. Next, a file data extractor extracts the file data from the locally-stored image file into the initialized allocation units without disturbing the locally-stored image file.

At the same time or thereafter, a directory area builder creates a new directory area for the partition using the directory map from the locally-stored image file. This may include adding an indication of the locally-stored image file to the new directory area. As before, a protection module may be used to protect the locally-stored image file from accidental deletion or modification.

BRIEF DESCRIPTION OF THE DRAWINGS

Various embodiments of the invention are now described with reference to the figures, in which.

DETAILED DESCRIPTION

Figure 1:
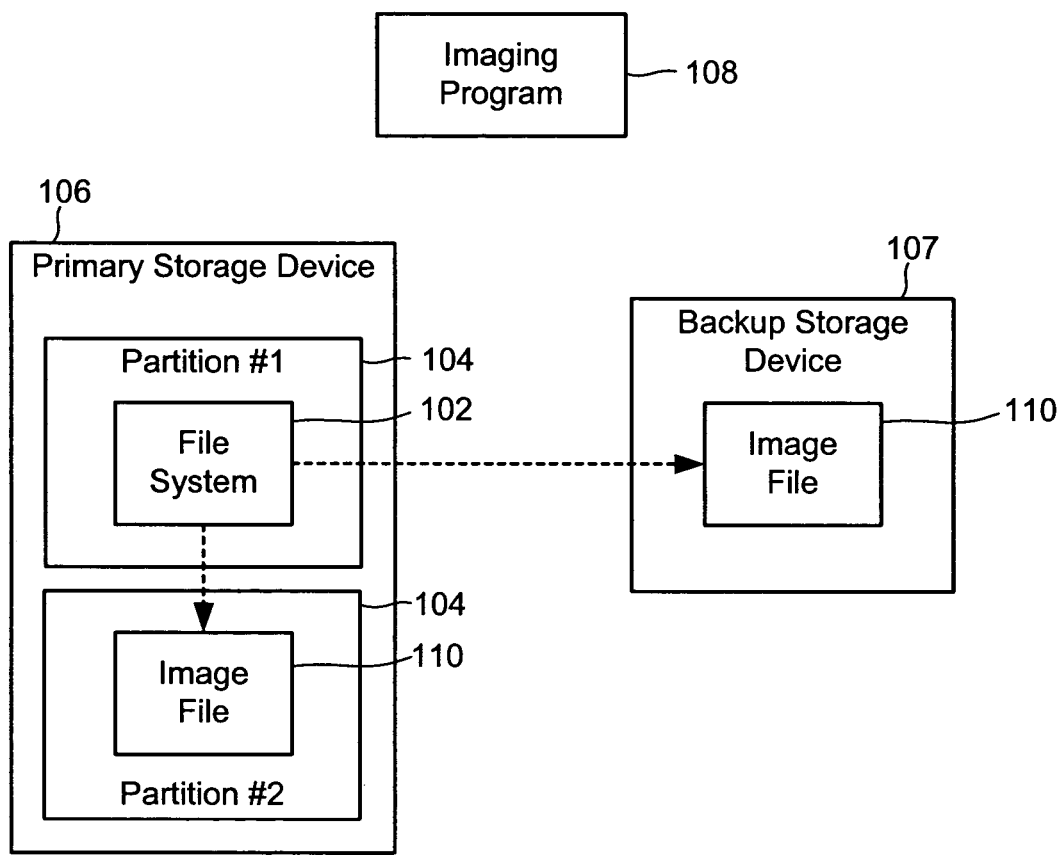
FIG. 1 is a block diagram of a conventional system for creating an image of a file system.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

The phrases "computer-readable medium" and "computer-readable storage medium," as referred to herein, generally refer to any form of storage device or medium capable of storing computer-readable instructions. Examples of computer-readable media include—without limitation—physical media, such as magnetic-storage media (e.g., hard disk drives and floppy disks), optical-storage media (e.g., CD- or DVD-ROMs), electronic-storage media (e.g., solid-state drives and flash media), and the like.

FIG. 1 illustrates a conventional process for imaging a file system 102 within a partition 104 of a primary storage device 106, such as a hard disk drive. As illustrated, a typical imaging program 108, such as Norton Ghost™, creates an exact image of the file system 102 in the form of an image file 110, within the file system 102 of a backup storage device 107. If the file system 102 is subsequently damaged, the imaging program 108 may be used to restore the image from the image file 110, returning the file system 102 from a partition 104 to its pre-backup state.

However, requiring additional hardware for storing the backup image file 110 increases the price of a computer system and may not be cost-justified where the primary storage device 106 has excess capacity. In recent years, hard drive capacity has outpaced the needs of a typical computer user.

To remove the requirement for a separate backup storage device 107, some imaging programs 108 will back up an image file 110 to a file system 102 on a different partition 104 of the primary storage device 106 (e.g., Partition #2). From the perspective of the imaging program 108, there is little difference between the two methods, since the OS may allow the file system 102 of Partition #2 to appear to the imaging program 108 as a separate storage location.

Unfortunately, creating Partition #2 reduces the storage space available to the file system 102 in Partition #1. For example, if the primary storage device 106 has a capacity of 100 gigabytes (GB), and Partition #2 is allocated 50 GB, then only 50 GB is available for the file system 102 of Partition #1. This is true whether or not Partition #2 is actually used for storing an image 110.

Furthermore, the primary storage device 106 must be typically partitioned before any software or data is installed on it. Hence, a user decides when initially configuring the system whether to create a backup partition 104 and how much storage space to allocate to it. This is undesirable in that a user may not know from the outset how much storage space is needed for the file system 102.

In addition, any file system 102 on each new partition 104 includes overhead that further reduces the capacity of the primary storage device 106. Likewise, the file system 102 of the Partition #2 is also susceptible to being damaged or corrupted, which could prevent subsequent access to a stored image file 110. The risk of corruption increases if a user frequently stores software programs and data in the backup partition 104.

Figure 2:
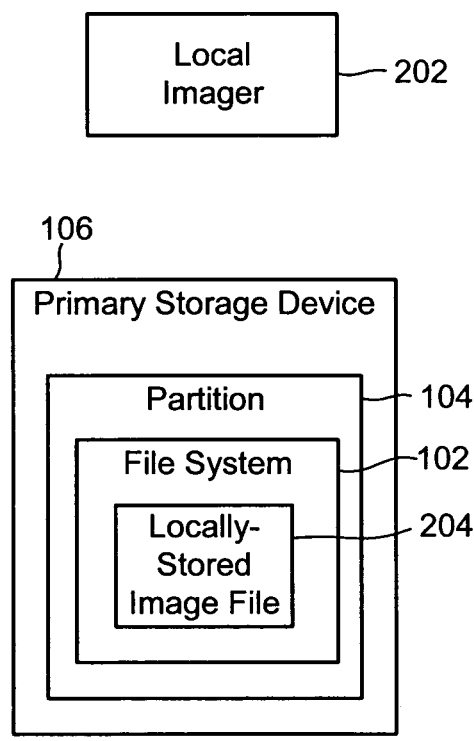
FIG. 2 is a block diagram of a local imager and a locally-stored image file according to an embodiment of the invention.

FIG. 2 illustrates an alternative method for imaging a file system 102 that solves the foregoing problems and disadvantages. As shown, a local imager 202 creates a locally-stored image file 204 of the file system 102. Unlike past approaches, however, the locally-stored image file 204 is stored on the same device 106, within the same partition 104 and file system 102 as the file system 102 being imaged. In the illustrated embodiment, the locally-stored image file 204 is represented as a file within the file system 102 from which it was created.

The local imager 202, as well as the other modules and components described herein, may be implemented using software, hardware, or any suitable combination thereof, using techniques known to those of skill in the art. Moreover, one of ordinary skill will recognize that the functionality of the local imager 202 may be implemented using more than one discrete module of code or device.

As will be apparent from a comparison with FIG. 1, the local imager 202 does not create an image file 110 on a backup storage device 107 or within a different partition 104 of the primary storage device 106 as with conventional imaging programs 108. However, the new location of the locally-stored image file 204 presents issues that are addressed below.

For example, as will be explained in greater detail hereafter, the local imager 202 takes steps to prevent the accidental deletion of the locally-stored image file 204, since the locally-stored image file 204 is now more accessible by reason of its location in the file system 102. Furthermore, the local imager 202 takes steps to make the locally-stored image file 204 easier to locate should the directory area of the file system 102 be damaged.

Figure 3:
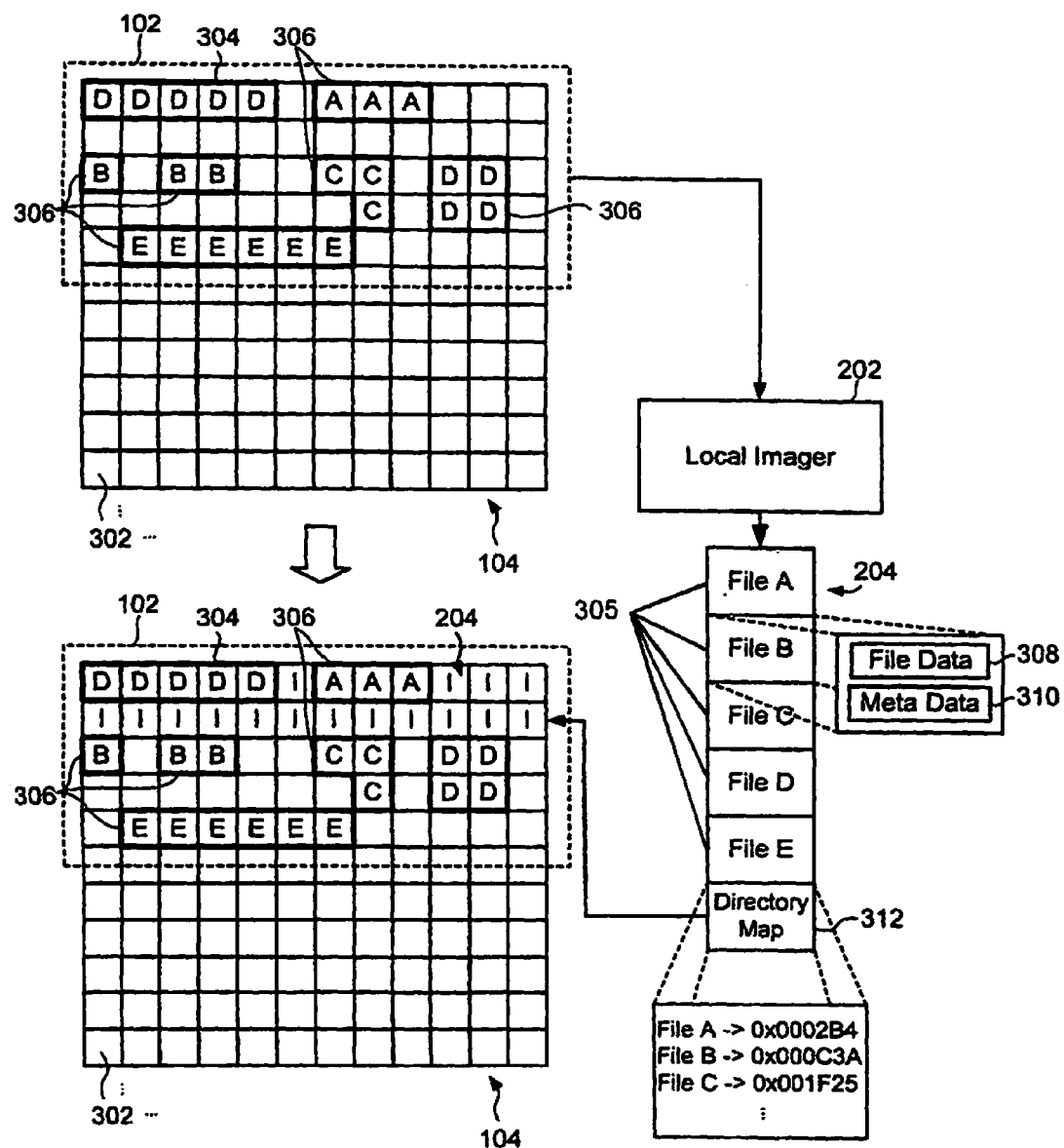
FIG. 3 is a detailed block diagram of a process for creating a locally-stored image file.

FIG. 3 provides additional details of a process for creating a locally-stored image file 204 according to an embodiment of the invention. As shown, a partition 104 may include a plurality of allocation units 302. The allocation units 302 may be physical storage blocks, commonly referred to as "sectors," or groups of storage blocks, sometimes referred to as "clusters." Whatever the terminology, the allocation units 302 represent data storage units within the primary storage device 106 (not shown).

As depicted, the allocation units 302 may be used to store a file system 102. In one embodiment, the file system 102 includes a control data structure area 304, which stores files names and organizational information (e.g., FAT, volume catalog, etc.) for a plurality of files 305. Five files 305 are illustrated, labeled "A" through "E" respectively. Allocation units 302 used for storing portions of a particular file 306 are indicated by a corresponding letter.

In the example embodiment, several of the files 305 are fragmented, i.e., not entirely stored along a logically-sequential series of discrete allocation units 302. Fragmentation is a natural consequence of operating a block-based storage device over time in which files 305 are variously created and deleted.

In one embodiment, for each allocation unit 302 occupied by a file 306 of the file system 102, the local imager 202 reads the allocation unit 302, optionally compresses it, and copies the allocation unit 302 to a locally-stored image file 204 within the partition 104. As used herein, the term "copy" does not necessarily mean an identical copy. For example, a local imager 202 may compress the allocation units 302, or a subset of them, using LZW or another suitable compression algorithm. Hence, the data copied to the locally-stored image file 204, while representative of the original allocation unit 302, may not be identical.

In one embodiment, the local imager 202 prevents the recursive copying of allocation units 302 already added to the locally-stored image file 204 by maintaining a record of a pre-imaging state of the partition 104 and only backing up allocation units 302 that were used by files 305 in that pre-imaging state.

In addition, the local imager 202 may copy all of the allocation units 302 for a given file 306 before continuing to the next file 306, resulting in the file data 308 for each file 306 being group together within the locally-stored image file 204. Grouping the file data for individual files has the effect of defragmenting the file system 102 when the locally-stored image file 204 is restored, as will be described in greater detail below.

As illustrated, the local imager 202 may add meta data 310 to the locally-stored image file 204 for each file 306. The meta data 310 may comprise various file attributes, examples of which include ownership attributes, access-control attributes, timestamp attributes, archival attributes, indexing attributes, encryption attributes, and/or compression attributes. Such file attributes are known to those of ordinary skill of the art and may affect, for example, whether a user may access a particular file 306 or whether a file 306 should be archived, encrypted, and/or compressed by the OS.

The locally-stored image file 204 (designated by "I" within the partition 104) grows to fill a number of allocation units 302 of the partition 104 not being used by the other files 305. When complete, the locally-stored image file 204 contains all of the data stored within the files 305 of the file system 102. However, the data may be compressed in one embodiment so that the locally-stored image file 204 occupies fewer allocation units 302 than the original file system 102.

In the depicted embodiment, the local imager 202 also adds a directory map 312 to the locally-stored image file 204. The directory map 312 functions like the directory area 304 of the file system 102 by associating names of files 305 with corresponding portions of file data 308 (and meta data 310) within the locally-stored image file 204. For example, as illustrated in FIG. 3, the directory map 312 may store offsets or other pointers into the locally-stored image file 204 referencing the corresponding file data 308. Of course, the directory map 312 may store more complex data structures, such as hierarchical directory information, file attributes, etc.

Figure 4:
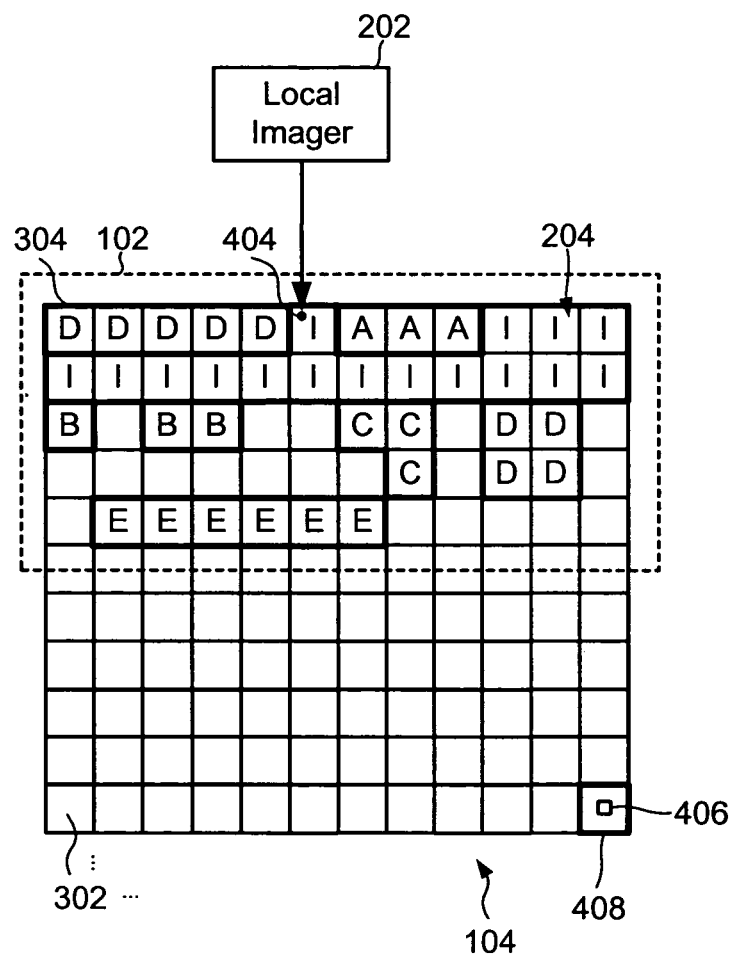
FIG. 4 is a block diagram of a technique for marking a locally-stored image file within a partition.

As illustrated in FIG. 4, the completed locally-stored image file 204 may be represented as a file within the file system 102 so that it may be easily located. Nevertheless, the local imager 202 may mark or otherwise preserve a record of at-least the first allocation unit 302 occupied by the locally-stored image file 204 in case the file system 102 is subsequently damaged. In one embodiment, the local imager 202 stores a unique beginning-of-image marker 404 within the first allocation unit 302 of the locally-stored image file 204. The marker 404 may be embodied as a sufficiently-long sequence of data that is unlikely to occur at random within the primary storage device 106. For example, the marker 404 could be a pre-determined 128-bit word, although shorter or longer markers 404 could be used.

As described in greater detail below, if the directory area 304 is subsequently damaged, the local imager 202 can search the partition 104 for the beginning-of-image marker 404 to locate the first allocation unit 302 of the locally-stored image file 204. Techniques for finding a known sequence of data within a partition 104 are known in the art.

Alternatively, the local imager 202 may store location information 406 for at least the first allocation unit 302 of the locally-stored image file 204 within a predetermined area 408 (e.g., allocation unit 302) of the partition 104. The location information 406 may be a cluster number, offset, pointer, or other location indicator. In certain embodiments, the location information 406 may point to all of the allocation units 302 used by the locally-stored image file 204.

If the predetermined area 408 is already being used for storing data for a file 306, the local imager 202 may select a next one in a set of alternative predetermined areas 408 or relocate the data within that storage location while maintaining the structure and integrity of the file system 102. Additionally, to prevent another program from overwriting the location information 406 with other data, the predetermined area 408 of the partition 104 may be marked as "bad" or "used" within the directory area 304.

In an alternative implementation, the locally-stored image file 204 does not appear as a file within the file system 102. Rather, the allocation units 302 used by the locally-stored image file 204 are marked as "bad" or "used" to prevent the allocation units 302 from being rewritten with other data. Thereafter, the local imager 202 maintains a record of the location of the locally-stored image file 204 within the partition 104 so that it can be subsequently located.

Figure 5:
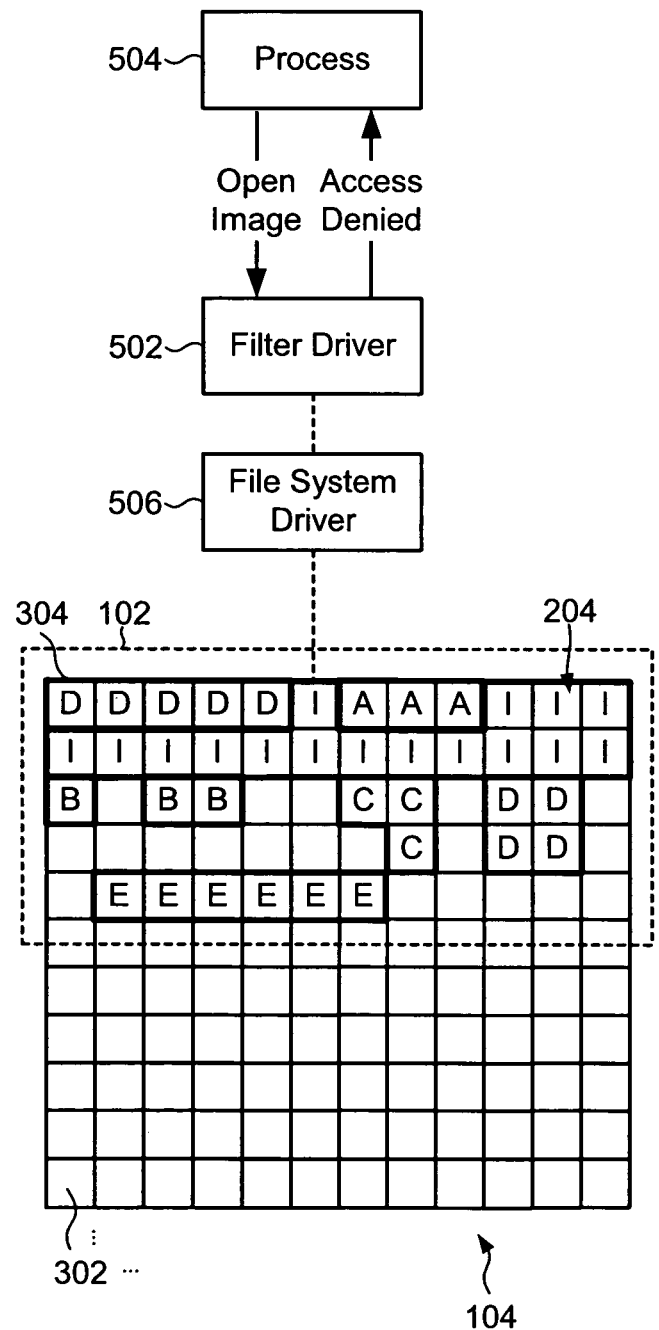
FIG. 5 is a block diagram of a first embodiment of a system for protecting a locally-stored image file from accidental deletion or modification.

FIG. 5 illustrates a technique for protecting the locally-stored image file 204 from accidental deletion or modification. Due to its new location, the locally-stored image file 204 may be more vulnerable to being deleted or modified by a user. Accordingly, in one embodiment, a filter driver 502 is inserted between a process 504 capable of accessing files 305 and a file system driver 506. The process 504 may be associated with an application program or a component of the OS. The file system driver 506 processes various file-access requests, such as requests to open the locally-stored image file 204.

In one embodiment, the filter driver 502 passes most file-access requests to the file system driver 506. However, when it intercepts a request to open or modify the locally-stored image file 204, it denies the request. Thus, the process 504 is prevented from accidentally deleting or modifying the locally-stored image file 204.

Figure 6:
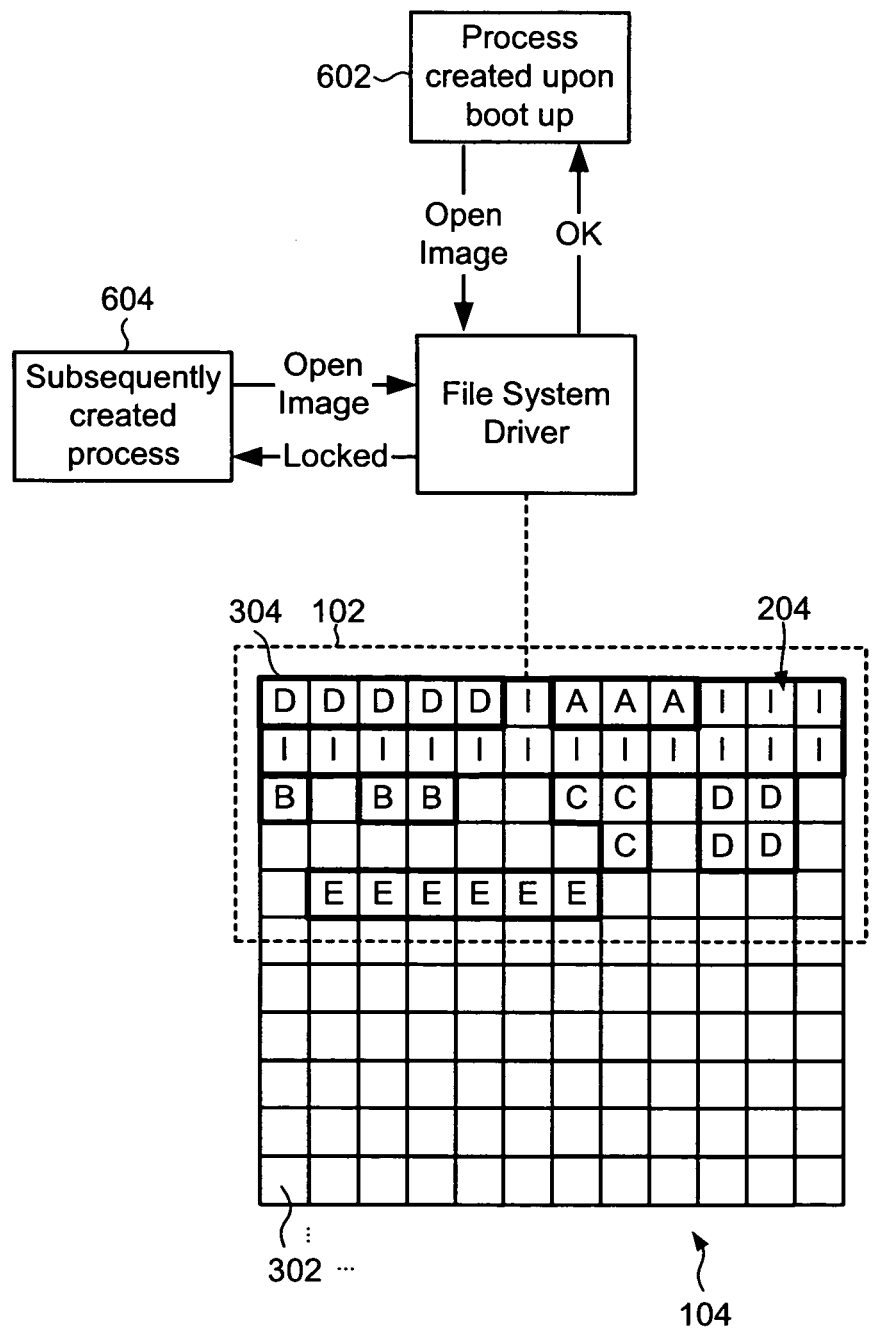
FIG. 6 is a block diagram of a second embodiment of a system for protecting a locally-stored image file from accidental deletion or modification.

In alternative embodiment, as shown in FIG. 6, a process 602 is created upon boot up (i.e., loading of the OS into memory) that successfully opens the locally-stored image file 204. In a typical OS, file-locking mechanisms are employed to prevent two different processes from opening and modifying the same file. Hence, when a subsequently created process 604 attempts to access to the locally-stored image file 204, the file system driver 506 will indicate that the locally-stored image file 204 is locked and refuse the request.

Figure 7:
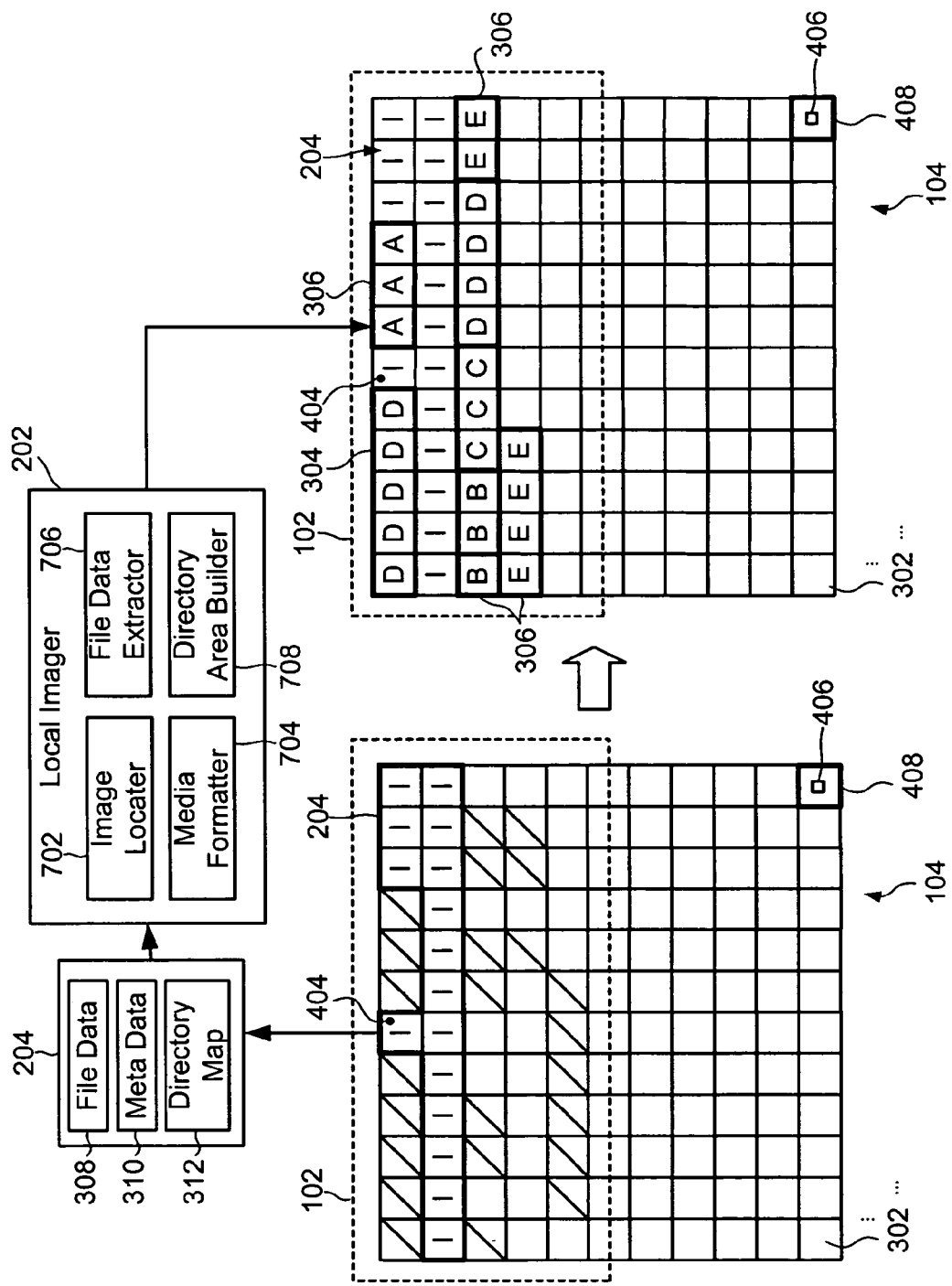
FIG. 7 is a detailed block diagram of a process for restoring a locally-stored image file.

Referring to FIG. 7, as previously explained, events may occur that destroy or corrupt the directory area 304 of the partition 104. Likewise, a user may inadvertently delete or modify one or more of the files 305. When such events happen, the user may wish to restore the file system 102 of the partition 104 to its pre-backup state.

To accomplish the restoration, the local imager 202 may include or be associated with a number of other modules or components, such as an image locater 702, a media formatter 704, a file data extractor 706, and a directory area builder 708. Each of the foregoing modules may be implemented using any suitable combination of hardware and software. Additionally, while the modules are depicted as components of the local imager 202, the modules could be embodied as separate programs or devices that are in communication with the local imager 202.

In one embodiment, the image locater 702 locates each allocation unit 302 occupied by the locally-stored image file 204 within the partition 104. Where the directory area 304 is undamaged, such a location process may be trivial, since the image locater 702 may simply retrieve the information from the directory area 304.

However, if the directory area 304 has been damaged, the image locater 702 may need to search for the beginning-of-image marker 404 of FIG. 4, indicating, in one embodiment, the first allocation unit 302 occupied by the locally-stored image file 204. Alternatively, the image locater 702 may need to access the location information 406 for the locally-stored image file 204 from the predetermined area 408.

The image locater 702 then locates the other allocation units 302 of the locally-stored image file 204 using, for instance, uncorrupted data from the directory area 304 (e.g., FAT, volume catalog), explicit links between allocation units 302, stored location information 406, etc.

Once all of the allocation units 302 used by the locally-stored image file 204 have been identified, the media formatter 704 initializes or formats the other allocation units 302 within the partition 104 or a subset of them (e.g., those allocation units 302 used by the file system 102, including the directory area 304). In FIG. 7, the initialized allocation units 304 are indicated by a "P" symbol. The process of initializing or formatting may include marking allocation units 302 as "available" within the FAT, testing the allocation units 302 to determine if they can reliably store data, marking any "bad" allocation units 302, etc. When complete, the initialized allocation units 302 are ready to store new data.

In one embodiment, the file data extractor 706 then extracts the file data 308 for each file 306 from the locally-stored image file 204 to the initialized allocation units 302, decompressing them as necessary. As shown in FIG. 7, the file data 308 is extracted without disturbing the locally-stored image file 204.

At the same time or thereafter, the directory area builder 708 creates a new directory area 304 for the partition 104 based on the directory map 312 from the locally-stored image file 204. As previously explained, one function of the directory map 312 is to associate the names of files 305 (and folders) from the original file system 102 with the corresponding portions of the file data 308. Since the file data extractor 706 knows which initialized allocation units 302 received or will receive the file data 308 for each file 306, the directory area builder 708 may create corresponding indications of the files 305 within the new directory area 304 and link those indications with the corresponding allocation units 302 used to receive the file data 308.

In one embodiment, the directory area builder 708 also adds an indication of the locally-stored image file 204 to the directory area 304 so that the image file 204, itself, may exist as a file within the file system 102. If this is done, the locally-stored image file 204 may be protected from inadvertent deletion or modification using one of the techniques described in connection with FIGS. 5 and 6.

Furthermore, the directory area builder 708 may access the meta data 310 for each file 306 to determine which attributes are to be set. As noted above, the meta data 310 may include various file attributes, such as ownership attributes, access-control attributes, timestamp attributes, archival attributes, indexing attributes, encryption attributes, and/or compression attributes. The directory area builder 708 sets the attributes specified in the meta data 310 for each file 306 using the appropriate technique for the file system 102 as will be known to those of skill in the art.

When the restoration is complete, the partition 104 will include a new file system 102 that is effectively identical to the one that was imaged, as depicted in FIG. 3. However, in one embodiment, the files 305 are no longer fragmented as a result of the file data 308 for each file 306 being grouped within the locally-stored image file 204. If this had not been done, as is possible in an alternative embodiment, the new file system 102 would be identical to the pre-imaging file system 102.

Eliminating fragmentation is advantageous because it reduces the need for performing multiple seeks between widely spaced-apart sections of the storage device 106 (e.g., jumps between nonadjacent tracks) in order to access a file 306 for reading and/or writing. This correspondingly reduces file access time.

Figure 8:
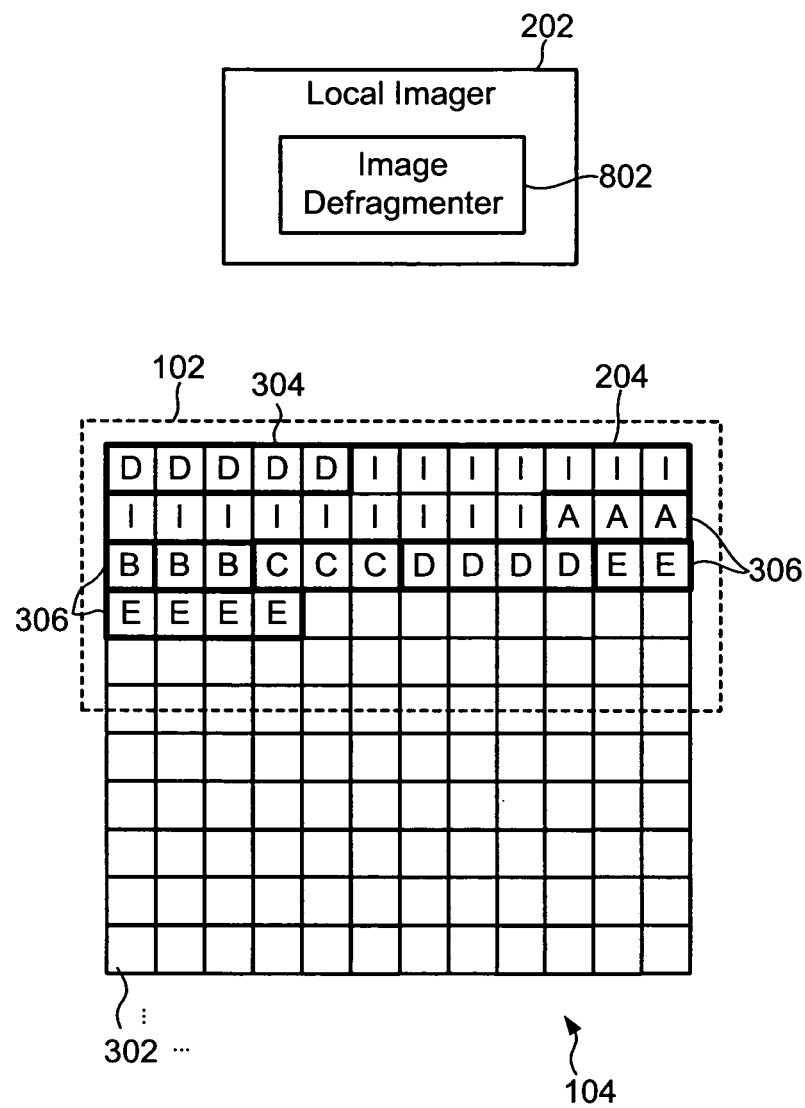
FIG. 8 is a block diagram of an image defragmenter.

However, one file that still may be fragmented is the locally-stored image file 204, because fragmentation may have occurred during the imaging process, as depicted in FIG. 3, and the above-described restoration process does not move or otherwise disturb the locally-stored image file 204. Accordingly, as shown in FIG. 8, after initializing the allocation units 302 and prior to extracting the file data 308, an image defragmenter 802 may defragment the locally-stored image file 204. Defragmentation is the process of reconfiguring the allocation units 302 used by a file such that the file is entirely stored along a logically-sequential series of discrete allocation units 302. A number of defragmentation utilities are known to those of skill in the art and will not be discussed in greater detail here.

Once the locally-stored image file 204 has been defragmented, the restoration process may proceed as described in FIG. 7 to extract the file data 308 and create the new directory area 304. When complete, any fragmentation that existed in the original file system 102 will have been eliminated ensuring optimal file access times.

Figure 9:
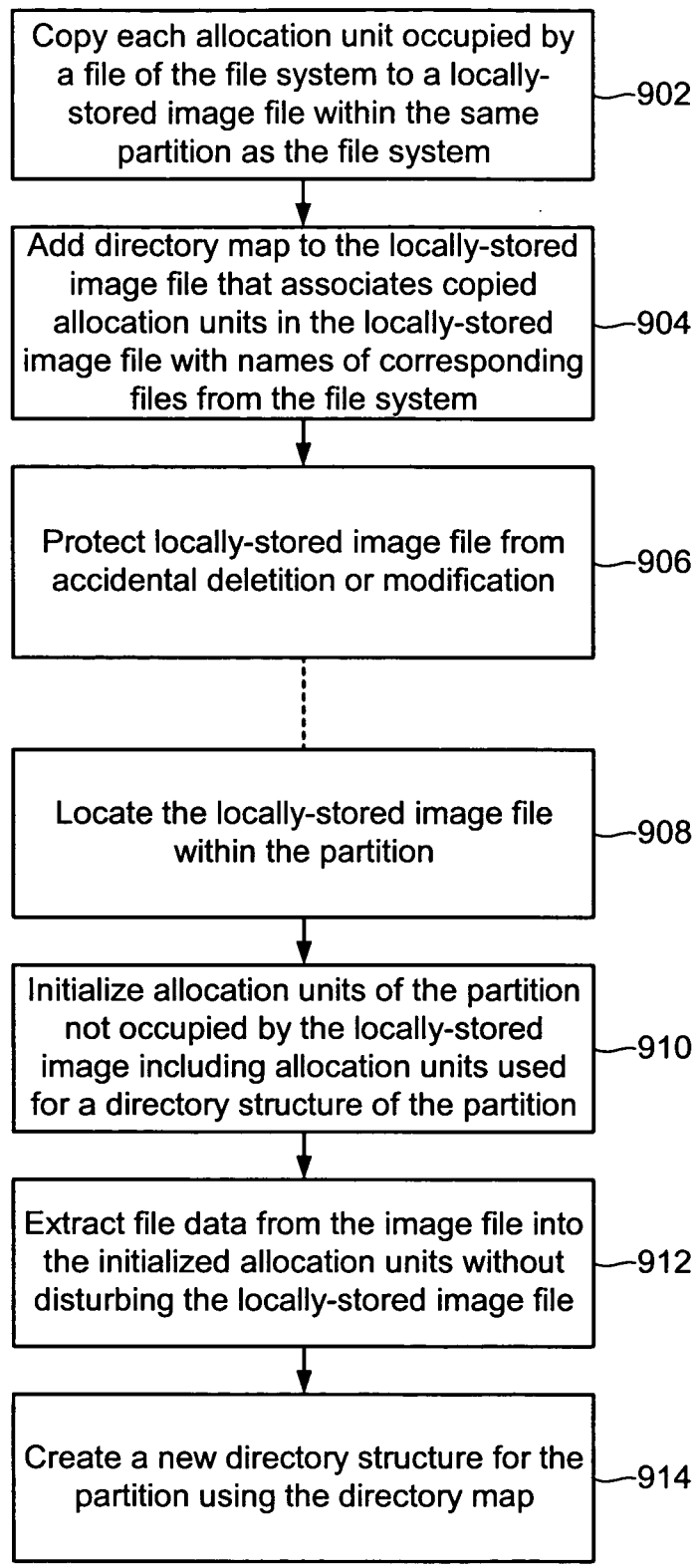
FIG. 9 is a flowchart of a method for localized imaging and restoration of a file system.

FIG. 9 is a flowchart of a method for localized imaging and restoration of a file system 102 within a partition 104. Initially, a local imager 202 copies 902 each allocation unit 302 occupied by a file 306 of the file system 102 to a locally-stored image file 204 within the same partition 104 as the file system 102. The allocation units 302 may be compressed using LZW or the like, resulting in a locally-stored image file 204 that occupies fewer allocation units 302 within the partition 104 than the file system 102 being imaged.

In addition, the local imager 202 adds 904 a directory map 312 to the locally-stored image file 204 that, among other things, associates copied allocation units 302 in the locally-stored image file 204 with names of corresponding files 305 from the file system 102.

A protection module may then protect 906 the locally-stored image file 204 from accidental deletion or modification. The protection module may be embodied as a filter driver 502 that is inserted between a process 504 capable of accessing files 305 and a file system driver 506. Alternatively, the protection module may be embodied as a process 602 created upon boot up that opens and thereby locks the locally-stored image file 204 so that subsequently-created processes 604 cannot access it.

At a future point in time, a user may desire to restore the locally-stored image file 204 to the partition 104, returning the file system 102 to its pre-imaging state. For example, the file system 102 may have been damaged or corrupted, or the user may have inadvertently deleted or modified certain key files 305.

In one embodiment, an image locater 702 locates 908 the locally-stored image file 204 within the partition 104. This may entail searching for a unique beginning-of-image marker 404, or reading location information 406 for an initial allocation unit 302 used for the locally-stored image file 204 from a predetermined area 408 of the partition 104.

Once the locally-stored image file 204 is found, a media formatter 704 initializes 910 at least a subset of the allocation units 302 of the partition 104 not occupied by the locally-stored image file 204, including one or more allocation units 302 used for a directory area 304 of the partition 104. Next, a file data extractor 706 extracts 912 the file data 308 from the locally-stored image file 204 into the initialized allocation units 302 without disturbing the locally-stored image file 204.

At the same time or thereafter, a directory area builder 708 creates 914 a new directory area 304 for the partition 104 using the directory map 312 from the locally-stored image file 204. This may include adding an indication of the locally-stored image file 204 to the new directory area 304. As before, a protection module may be used to protect the locally-stored image file 204 from accidental deletion or modification.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for backing up a file system in a partition comprising a plurality of allocation units, the method comprising:

creating a locally-stored image file by copying each allocation unit occupied by a plurality of files of the file system to the locally-stored image file, wherein the locally-stored image file is located within the same partition as the file system being backed up;

adding a directory map to the locally-stored image file that associates copied allocation units in the locally-stored image file with names of corresponding files from the file system; and subsequent to creating the locally-stored image file, protecting the locally-stored image file from accidental user deletion or modification by initiating a process at system startup that opens the locally-stored image file to block subsequent processes from accessing the locally-stored image file.

2. The method of claim 1, wherein copying comprises compressing at least a subset of the allocation units.

3. The method of claim 1, wherein copying comprises:

maintaining a record of a pre-imaging state of the file system; and copying only allocation units occupied by files included within the pre-imaging state of the file system.

4. The method of claim 1, wherein adding comprises grouping within the locally-stored image file the copied allocation units for individual files of the file system.

5. The method of claim 1, wherein copying comprises storing within the locally-stored image file one or more attributes related to each file, wherein the attributes comprise at least one of ownership attributes, access-control attributes, timestamp attributes, archival attributes, indexing attributes, encryption attributes, and compression attributes.

6. The method of claim 1, further comprising marking a beginning point of the locally-stored image file to assist in locating the locally-stored image file in the event of directory area corruption.

7. The method of claim 6, wherein marking comprises storing a unique beginning-of-image marker at an initial allocation unit occupied by the locally-stored image file.

8. The method of claim 6, wherein marking comprises storing, at a predetermined area of the partition, a location of an initial allocation unit occupied by the locally-stored image file.

9. The method of claim 1, wherein protecting the locally-stored image file further comprises providing a filter driver that intercepts and denies requests to access the locally-stored image file.

10. A method for restoring a file system to a partition comprising a plurality of allocation units, the method comprising:
   accessing a locally-stored image file located within the partition to which the file system is to be restored, the locally-stored image file comprising a directory map and file data for a plurality of files;
   initializing at least a subset of the allocation units of the partition not occupied by the locally-stored image file including one or more allocation units used for a directory area of the partition;
   extracting the file data from the locally-stored image file into the initialized allocation units without disturbing the locally-stored image file;
   creating a new directory area for the partition using the directory map; and
   protecting the locally-stored image file from accidental user deletion or modification subsequent to creation of the locally-stored image file by initiating a process at system startup that opens the locally-stored image file to block subsequent processes from accessing the locally-stored image file.

11. The method of claim 10, wherein the directory map associates names for the plurality of files with corresponding portions of the file data, and wherein creating comprises generating a new directory area for the partition that associates the file names with the extracted file data.

12. The method of claim 10, wherein creating comprises adding an indication of the locally-stored image file to the new directory area.

13. The method of claim 10, wherein extracting comprises decompressing at least a subset of the file data.

14. The method of claim 10, wherein the directory map indicates at least one attribute for a file, and wherein creating comprises setting the at least one attribute for the file in the directory area, wherein the at least one attribute comprises at least one of an ownership attribute, an access control attribute, a timestamp attribute, an archival attribute, an indexing attribute, an encryption attribute, and a compression attribute.

15. The method of claim 10, wherein accessing comprises searching for an allocation unit containing a unique beginning-of-image marker for the locally-stored image file.

16. The method of claim 10, wherein accessing comprises reading from a predetermined area of the partition a location of an initial allocation unit of the locally-stored image file.

17. The method of claim 10, further comprising defragmenting the locally-stored image file within the partition prior to extracting the file data.

18. The method of claim 10, wherein protecting the locally-stored image file further comprises providing a filter driver that intercepts and denies requests to access the locally-stored image file.

19. An apparatus for backing up a file system in a partition comprising a plurality of allocation units, the apparatus comprising:
   a processor;
   a local imager programmed to create a locally-stored image file by copying each allocation unit occupied by a plurality of files of the file system to the locally-stored image file, wherein the locally-stored image file is located within the same partition as the file system being backed up, and wherein the local imager is configured to add a directory map to the locally-stored image file that associates copied allocation units in the locally-stored image file with names of corresponding files from the file system; and
   a protection component programmed to protect the locally-stored image file from accidental user deletion or modification subsequent to creation of the locally-stored image file by initiating a process at system startup that opens the locally-stored image file to block subsequent processes from accessing the locally-stored image file.

20. The apparatus of claim 19, wherein the local imager is configured to compress at least a subset of the allocation units copied to the locally-stored image file.

21. The apparatus of claim 19, wherein the local imager is configured to maintain a record of a pre-imaging state of the file system and to copy only allocation units occupied by files included within the pre-imaging state of the file system.

22. The apparatus of claim 19, wherein the local imager is configured to group within the locally-stored image file the copied allocation units for individual files of the file system.

23. The apparatus of claim 19, wherein the local imager is configured to store within the locally-stored image file one or more attributes relating to at least one file of the file system, wherein the file attributes comprise at least one of ownership attributes, access-control attributes, timestamp attributes, archival attributes, indexing attributes, encryption attributes, and compression attributes.

24. The apparatus of claim 19, wherein the local imager is configured to mark a beginning point of the locally-stored image file to assist in locating the locally-stored image file in the event of directory area corruption.

25. The apparatus of claim 24, wherein the local imager is configured to mark the beginning point by storing a unique beginning-of-image marker at an initial allocation unit occupied by the locally-stored image file.

26. The apparatus of claim 24, wherein the local imager is configured to mark the beginning point by storing, at a predetermined area of the partition, a location of an initial allocation unit occupied by the locally-stored image file.

27. The apparatus of claim 19, wherein the protection component further comprises a filter driver that intercepts and denies requests to access the locally-stored image file.

28. An apparatus for restoring a file system to a partition comprising a plurality of allocation units, the apparatus comprising:
   a processor;

an image locater to find a locally-stored image file located within the partition to which the file system is to be restored, the locally-stored image file comprising a directory map and file data for a plurality of files;

a media formatter to initialize at least a subset of the allocation units of the partition not occupied by the locally-stored image file including one or more allocation units used for a directory area of the partition;

a data extractor to extract the file data from the locally-stored image file into the initialized allocation units without disturbing the locally-stored image file;

a directory area builder to build a new directory area for the partition using the directory map; and a protection component programmed to protect the locally-stored image file from accidental user deletion or modification subsequent to creation of the locally-stored image file by initiating a process at system startup that opens the locally-stored image file to block subsequent processes from accessing the locally-stored image file.

29. The apparatus of claim 28, wherein the directory map associates names for the plurality of files with corresponding portions of the file data, and wherein the directory area builder is configured to generate a new directory area for the partition that associates the file names with the extracted file data.

30. The apparatus of claim 28, wherein the directory area builder is configured to add an indication of the locally-stored image file to the new directory area.

31. The apparatus of claim 28, wherein the data extractor is configured to decompress at least a subset of the file data.

32. The apparatus of claim 28, wherein the directory map indicates at least one attribute for a file, wherein the directory area builder is configured to set the at least one attribute of the file in the directory area, and wherein the at least one attribute comprises at least one of an ownership attribute, an access control attribute, a timestamp attribute, an archival attribute, an indexing attribute, an encryption attribute, and a compression attribute.

33. The apparatus of claim 28, wherein the image locater is configured to search for an allocation unit containing a unique beginning-of-image marker for the locally-stored image file.

34. The apparatus of claim 28, wherein the image locater is configured to read from a predetermined area of the partition a location of at least a first allocation unit of the locally-stored image file.

35. The apparatus of claim 28, further comprising an image defragmenter to defragment the locally-stored image file within the partition before the data extractor extracts the file data.

36. The apparatus of claim 28, wherein the protection component further comprises a filter driver that intercepts and denies requests to access the locally-stored image file.

37. A method for localized backup and restoration of a file system in a partition comprising a plurality of allocation units, the method comprising:

creating a locally-stored image file by copying each allocation unit occupied by a plurality of files of the file system to the locally-stored image file, wherein the locally-stored image file is located within the same partition as the file system being backed up;

adding a directory map to the locally-stored image file that associates copied allocation units in the locally-stored image file with names of corresponding files from the file system;

locating the locally-stored image file within the partition;

initializing at least a subset of the allocation units of the partition not occupied by the locally-stored image file including one or more allocation units used for a directory area of the partition;

extracting file data from the locally-stored image file into the initialized allocation units without disturbing the locally-stored image file;

creating a new directory area for the partition using the directory map; and subsequent to creating the locally-stored image file, protecting the locally-stored image file from accidental user deletion or modification by initiating a process at system startup that opens the locally-stored image file to block subsequent processes from accessing the locally-stored image file.

38. A computer-readable storage medium comprising program code for backing up a file system in a partition comprising a plurality of allocation units, the computer-readable storage medium comprising:

program code for creating a locally-stored image file by copying each allocation unit occupied by a plurality of files of the file system to a locally-stored image file, wherein the locally-stored image file is located within the same partition as the file system being backed up;

program code for adding a directory map to the locally-stored image file that associates copied allocation units in the locally-stored image file with names of corresponding files from the file system; and program code for protecting the locally-stored image file from accidental user deletion or modification subsequent to creation of the locally-stored image file by initiating a process at system startup that opens the locally-stored image file to block subsequent processes from accessing the locally-stored image file.

39. A computer-readable storage medium comprising program code for restoring a file system to a partition comprising a plurality of allocation units, the computer-readable storage medium comprising:

program code to access a locally-stored image file located within the partition to which the file system is to be restored, the locally-stored image file comprising a directory map and file data for a plurality of files;

program code to initialize at least a subset of the allocation units of the partition not occupied by the locally-stored image file including one or more allocation units used for a directory area of the partition;

program code to extract the file data from the locally-stored image file into the initialized allocation units without disturbing the locally-stored image file;

program code to create a new directory area for the partition using the directory map; and program code to protect the locally-stored image file from accidental user deletion or modification subsequent to creation of the locally-stored image file by initiating a process at system startup that opens the locally-stored image file to block subsequent processes from accessing the locally-stored image file.

* * * * *